United States Patent
Kim et al.

(10) Patent No.: US 9,346,031 B2
(45) Date of Patent: May 24, 2016

(54) SODIUM-NANO LIQUID REACTIVITY EXPERIMENT APPARATUS

(75) Inventors: Moo Hwan Kim, Pohang-si (KR); Ho Seon Ahn, Pohang-si (KR); Gunyeop Park, Daegu (KR); Soojae Kim, Pohang-si (KR)

(73) Assignee: POSTECH ACADEMY-INDUSTRY FOUNDATION, Pohang-Si (KR)

( * ) Notice: Subject to any disclaimer, the term of this patent is extended or adjusted under 35 U.S.C. 154(b) by 0 days.

(21) Appl. No.: 14/382,538

(22) PCT Filed: Mar. 20, 2012

(86) PCT No.: PCT/KR2012/001982
§ 371 (c)(1),
(2), (4) Date: Sep. 2, 2014

(87) PCT Pub. No.: WO2013/133469
PCT Pub. Date: Sep. 12, 2013

(65) Prior Publication Data
US 2015/0151270 A1    Jun. 4, 2015

(30) Foreign Application Priority Data
Mar. 6, 2012 (KR) .................. 10-2012-0022844

(51) Int. Cl.
*B01J 19/18* (2006.01)
*B01J 7/02* (2006.01)
*C01D 1/04* (2006.01)
*B82Y 40/00* (2011.01)

(52) U.S. Cl.
CPC .. *B01J 19/18* (2013.01); *B01J 7/02* (2013.01); *C01D 1/04* (2013.01); *B01J 2219/00051* (2013.01); *B82Y 40/00* (2013.01)

(58) Field of Classification Search
CPC ...................... B01J 19/18; B01J 2219/00074
USPC .................... 422/145, 135, 158, 159, 162
See application file for complete search history.

(56) References Cited

U.S. PATENT DOCUMENTS 3,256,068 A * 6/1966 Burke, Jr. .............. C01B 33/193
106/492

FOREIGN PATENT DOCUMENTS

| JP | 2003-268417 | 9/2003 |
|---|---|---|
| JP | 3930495 | 6/2007 |
| JP | 2011-179023 | 9/2011 |
| JP | 2011-179024 | 9/2011 |

* cited by examiner

*Primary Examiner* — Natalia Levkovich
(74) *Attorney, Agent, or Firm* — Lex IP Meister, PLLC

(57) ABSTRACT

A sodium-nanoliquid reactivity experiment apparatus includes: a storage tank that stores liquid sodium; a mixing tank that is connected to the storage tank through a first transport line to receive supply of the liquid sodium and that injects nanoparticles to mix the nanoparticles with the liquid sodium; and a reactor that is connected to the mixing tank through a second transport line to receive supply of a sodium-nanoparticle mixture and that injects water to react the water with the sodium-nanoparticle mixture.

8 Claims, 6 Drawing Sheets

SODIUM-NANO LIQUID REACTIVITY EXPERIMENT APPARATUS

TECHNICAL FIELD

The present invention relates to an experiment apparatus for observing reactivity when sodium contacts water.

BACKGROUND ART

A sodium cooled fast reactor, which is one of alternatives of a fourth generation nuclear reactor that uses sodium as a coolant of a reactor, can enhance a nuclear fuel use rate, does not require a moderator or a high pressure within a nuclear reactor, and has excellent thermal efficiency, compared with an existing nuclear reactor.

However, sodium has a drawback in that it intensively reacts with water and oxygen, and combustion and explosion risk due to a strong exothermic chemical reaction require more resolute safety securement for both a cooling system and an energy conversion system, thereby weakening economic efficiency of a system. It is difficult to substantially apply sodium as a coolant due to a risk of such sodium.

According to a thesis (Jun-ichi Saito et al., "A study of atomic interaction between suspended nanoparticles and sodium atoms in liquid sodium", Nuclear engineering and design, Vol. 240, p. 2664-2673, 2010) that was recently suggested in Japan in relation to such strong chemical activity of sodium, by appropriately matching nanoparticles with sodium, activity of the sodium can be reduced. According to the thesis, when well-dispersing nanoparticles in sodium in a liquid state, the nanoparticles have a surface area that is relatively larger than that of sodium atoms. When a large surface area of nanoparticles is formed with many unsaturated coupled atoms, the nanoparticles are easily coupled to sodium atoms due to high activity. The coupled atoms form a sodium-nanoparticle cluster to reduce reactivity with water.

In existing research, only studies concentrating on interaction of nanoparticles and sodium in terms of reactivity of sodium have been performed, but a basis of a sodium reaction is an oxidation-reduction process having an electron transfer process, and such a reaction generally passes through a very complex multi-step process, but a detailed mechanism thereof is not accurately understood. A reaction speed of sodium and water may be determined by a process (reduction) of generating hydrogen of an elemental state having high reactivity, as separated electrons react with water instead of a process (oxidation) in which electrons are separated from sodium. If nanoparticles can well "absorb" electrons, reactivity of electrons and water may be greatly reduced with only some nanoparticles. When a level in which nanoparticles of various metals like electrons is estimated through computational chemistry, a suggested possibility may be examined.

Metal nanoparticles can absorb electrons and show an affinity with hydrogen according to a property of a transition metal. A first aspect thereof is to disturb a process in which hydrogen is generated as electrons are absorbed by water molecules, a second aspect thereof is to disturb a process in which the generated hydrogen advances to explosion, and both of these aspects may contribute to reducing reactivity of a sodium metal.

However, up to now, an apparatus for dispersing nanoparticles in sodium of a liquid state has not been suggested, and an apparatus for dispersing nanoparticles and an experiment apparatus that is developed to continuously perform an experiment for determining reactivity of distributed sodium do not exist.

The above information disclosed in this Background section is only for enhancement of understanding of the background of the invention, and therefore it may contain information that does not form the prior art that is already known in this country to a person of ordinary skill in the art.

DISCLOSURE

Technical Problem

The present invention has been made in an effort to provide a sodium-nanoliquid reactivity experiment apparatus having advantages of experimenting with an explosion reaction of a sodium-nanoliquid and water and production of a sodium-nanoliquid in order to determine whether a reaction of the sodium-nanoliquid and water is suppressed.

Technical Solution

An exemplary embodiment of the present invention provides a sodium-nanoliquid reactivity experiment apparatus including: a storage tank that stores liquid sodium; a mixing tank that is connected to the storage tank through a first transport line to receive supply of the liquid sodium and that injects nanoparticles to mix the nanoparticles with the liquid sodium; and a reactor that is connected to the mixing tank through a second transport line to receive supply of a sodium-nanoparticle mixture and that injects water to react the water with the sodium-nanoparticle mixture.

The storage tank may include a cylindrical sodium storage unit having a lower portion of a hemispherical shape and a storage tank cover that covers the sodium storage unit.

In a portion of the storage tank cover, a window for viewing the inside of the sodium storage unit may be formed.

The mixing tank may include a cylindrical mixing unit having a lower portion of a hemispherical shape, a mixing tank cover that covers the mixing unit, and a nanoparticle injection line that is connected to the mixing unit to inject the nanoparticles.

In an upper portion of the mixing tank cover, a motor may be provided, and the sodium-nanoliquid reactivity experiment apparatus may further include a stirrer that is connected to a driving shaft of the motor to penetrate the mixing tank cover and that is introduced to the inside of the mixing unit, and an impeller that is mounted in an end portion of the stirrer.

The reactor may include a reacting region in which a reaction of the sodium-nanoliquid mixture and water occurs, a buret that is connected between the second transport line and the reacting region to adjust an amount of the supplied sodium-nanoliquid mixture, and a water injection pipe that can inject water into the reacting region.

The sodium-nanoliquid reactivity experiment apparatus may further include a vapor trap that is connected to the upper end of the buret to filter an evaporated sodium vapor.

The sodium-nanoliquid reactivity experiment apparatus may further include a heater that is installed to enclose each of the storage tank and the mixing tank.

The heater may include a casting heater that is mounted in a lower portion of a hemispherical shape of the mixing tank or the storage tank, and a band heater that is mounted in a mixing unit of the mixing tank or a sodium storage unit of the storage tank that is formed in a cylindrical shape.

Advantageous Effects

As described above, by a sodium-nanoliquid reactivity experiment apparatus according to an exemplary embodiment of the present invention, a continuous experiment that can determine reactivity with water while dispersing nanoparticles in sodium of a liquid state can be performed.

MODE FOR INVENTION

Figure 1:
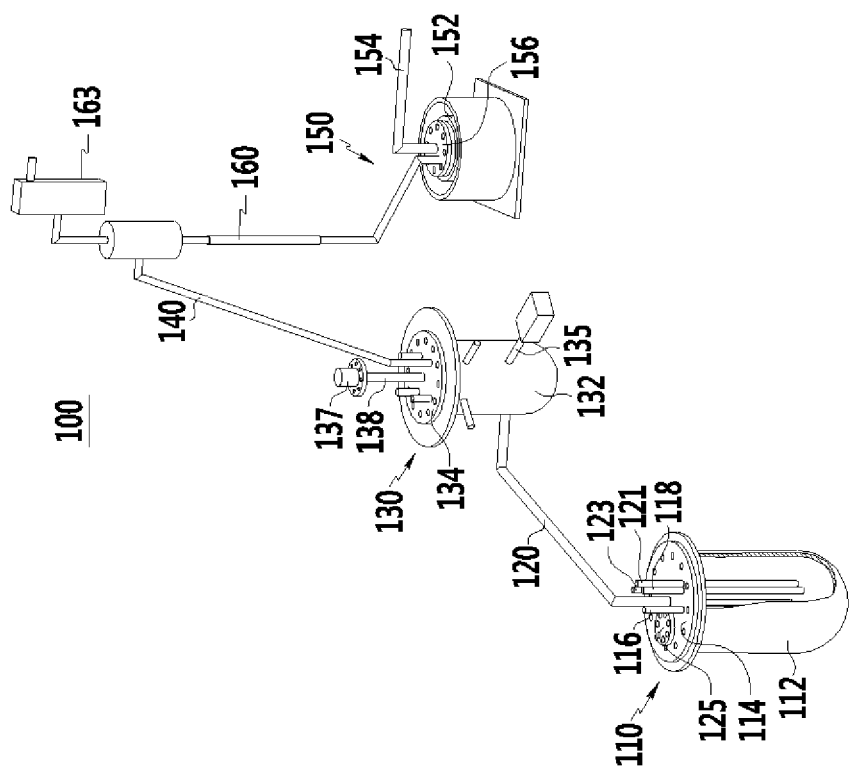
FIG. 1 is a perspective view illustrating a sodium-nanoliquid reactivity experiment apparatus according to an exemplary embodiment of the present invention.

Hereinafter, exemplary embodiments of the present invention will be described in detail with reference to the attached drawings such that the present invention can be easily put into practice by those skilled in the art. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a perspective view illustrating a sodium-nanoliquid reactivity experiment apparatus according to an exemplary embodiment of the present invention.

Referring to FIG. 1, a sodium-nanoliquid reactivity experiment apparatus 100 according to the present exemplary embodiment is an experiment apparatus for observing explosive reactivity when sodium contacts water, and is formed with three units of a storage tank 110, a mixing tank 130, and a reactor 150. The storage tank 110 stores a large amount of sodium in a liquid state, and sodium and nanoparticles are dispersed in the mixing tank 130. A reaction experiment of sodium and water or sodium in which nanoparticles are added and water is performed in the reactor 150. In the storage tank 110, the mixing tank 130, and the reactor 150, a heater for producing liquid sodium is installed, and by maintaining air-tightness, external air from the outside is blocked.

The storage tank 110 includes a cylindrical sodium storage unit 112 having a lower portion of a hemispherical shape and a storage tank cover 114 that covers the cylindrical sodium storage unit 112, stores a large amount of liquid sodium in a pure liquid sodium state by dissolving the large amount of liquid sodium, and performs a function of supplying sodium into the experiment apparatus. The storage tank 110 may be made of stainless steel, and an argon gas injection line 116, a temperature gauge 118, a pressure gauge 121, and a level gauge 123 that are connected by a stainless steel tube may be installed at the storage tank cover 114. The storage tank 110 may be produced to have an entire capacity of, for example, 730 ml, and the argon gas injection line 116 may have a diameter of a quarter of an inch.

The level gauge 123 includes two electrodes that are extended to the inside of the sodium storage unit 112 and performs a function of determining an amount of sodium that is stored in the sodium storage unit 112, and when both the electrodes contact the sodium, while a current flows, the level gauge 123 may measure an amount of sodium. The heater may heat the internal sodium while enclosing the storage tank 110, and a first transport line 120 is connected to the storage tank cover 114 and to the mixing tank 130 to move the sodium. Further, in a portion of the storage tank cover 114, a window 125 is formed to enable viewing of the sodium that is stored at the storage tank 110.

The mixing tank 130 includes a cylindrical mixing unit 132 having a lower portion of a hemispherical shape and a mixing tank cover 134 that covers the mixing unit 132. The first transport line 120 is connected to a side surface of the mixing unit 132 to supply sodium that is transferred from the storage tank 110 to the mixing tank 130. A nanoparticle injection line 135 is connected to another portion of a side surface of the mixing unit 132 to enable nanoparticles to be injected into the liquid sodium that is supplied to the mixing tank 130. The mixing tank 130 may be produced to have an entire capacity of, for example, 300 ml.

A nanoparticle is a microparticle of a nanosize, and may be introduced into an experiment apparatus of the present exemplary embodiment in consideration of an affinity with an electron of a nanoparticle and an affinity with hydrogen of a nanoparticle. When an affinity with an electron of a nanoparticle is large, the large electron affinity disturbs electrons that are generated by sodium from being transferred to water and thus hydrogen generation can be reduced. Further, although hydrogen is generated at a slower speed than that of a case in which a nanoparticle does not exist, as water competitively reacts with electrons, when nanoparticles absorb hydrogen, a rapid reaction advancing to explosion can be secondarily reduced.

A kind of nanoparticles may be selected through calculation of electron affinity and hydrogen affinity of several nanoparticle models, and most metals show a considerably large electron affinity and have sufficient hydrogen atom coupling energy. For example, nanoparticles of Cu, Pd, Au, and Ni may be selectively introduced, and particularly, Ni nanoparticles having large electron affinity and hydrogen affinity may be introduced into an experiment apparatus of the present exemplary embodiment.

Figure 2:
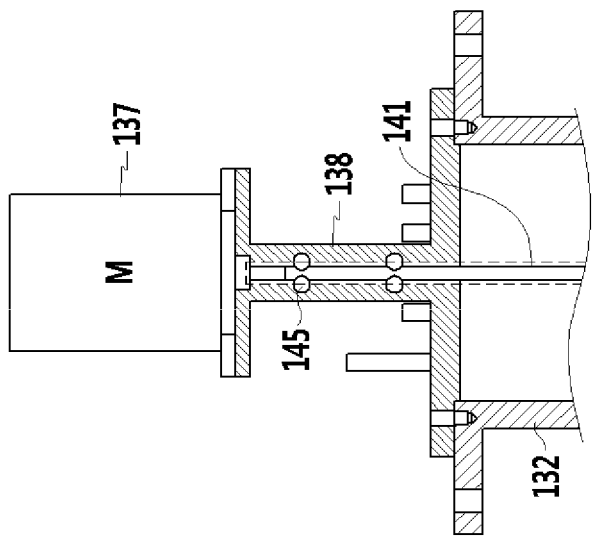
FIG. 2 is a cross-sectional view illustrating a stirrer of a sodium-nanoliquid reactivity experiment apparatus according to an exemplary embodiment of the present invention.

FIG. 2 is a cross-sectional view illustrating a stirrer of a sodium-nanoliquid reactivity experiment apparatus according to an exemplary embodiment of the present invention.

As shown in FIG. 2, in an upper end portion of the mixing tank cover 134, a motor 137 is installed, and a stirrer 141 that is connected to a driving shaft of the motor 137 is connected to the inside of the mixing unit 132 through a tube 138 of a state in which air-tightness is maintained. An impeller is mounted in an end portion of the stirrer 141 to perform a function of well-mixing nanoparticles and liquid sodium. In order to maintain air-tightness, an O-ring 145 may be mounted between the stirrer 141 and the tube 138.

An argon gas injection line, a pressure gauge, a temperature gauge, and a level gauge may be installed in the mixing tank cover 134. Further, a second transport line 140 is installed in the mixing tank cover 134, and the second transport line 140 is connected to the reactor 150 to transfer liquid sodium that is mixed in the mixing unit 132 to the reactor 150.

The reactor 150 includes a reacting region 152 in which a reaction of sodium and water actually occurs, a buret 160 that is connected between the second transport line 140 and the reacting region 152 to adjust an amount of supplied liquid sodium, and a water injection pipe 154 that can inject water into the reacting region 152.

The reacting region 152 is formed with a cylindrical airtight container that may be made of stainless steel that is beneficial for easy processing and that can easily endure a high temperature. A reactor cover 156 is mounted in an upper end portion of the reacting region 152, and the buret 160 and the water injection pipe 154 communicate with the inside of the reacting region 152 through the reactor cover 156. The buret 160 is made of a glass material that can show the inside, and may adjust an amount of liquid sodium. Further, a sodium vapor that is evaporated by a high temperature may be filtered through a vapor trap 163. In order to maintain air-tightness, a rubber O-ring may be mounted between constituent elements constituting the reactor 150. Such a rubber O-ring may be made of a Viton (chemical name: fluoroelastomer) material that well endures a high temperature.

In order to observe explosion reactivity within the reacting region 152, a temperature gauge and a pressure gauge may be installed in the reactor cover 156, and in order to form an argon atmosphere within the reacting region 152, an argon gas injection line may be installed in the reactor cover 156. In this way, in order to securely maintain air-tightness, measuring apparatuses that are inserted into the reacting region 152 for measurement are coupled to fittings. A heater in which a cartridge heater is inserted is installed in a lower portion of the reacting region 152 to perform a heating action.

Figure 3:
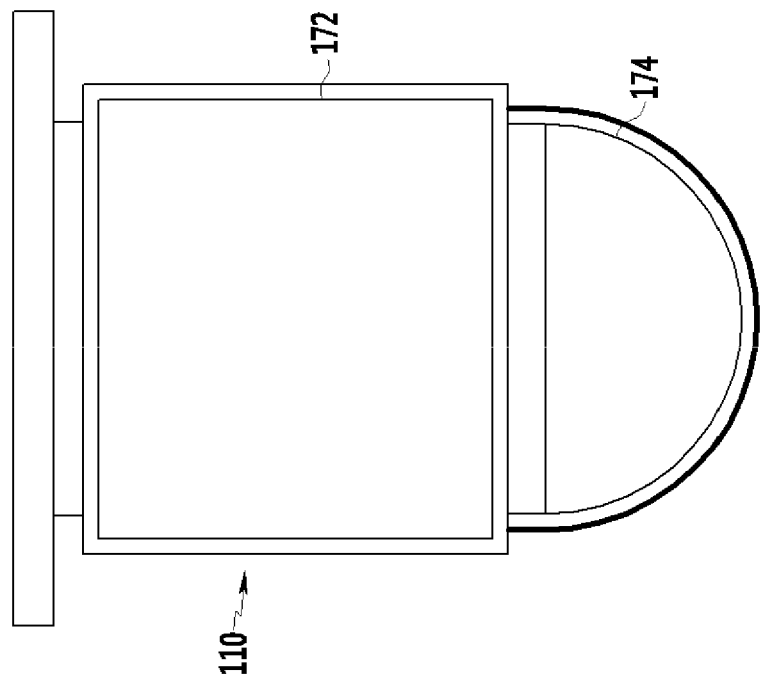
FIG. 3 is a schematic diagram illustrating a heater that is applied to a sodium-nanoliquid reactivity experiment apparatus according to an exemplary embodiment of the present invention.

FIG. 3 is a schematic diagram illustrating a heater that is applied to a sodium-nanoliquid reactivity experiment apparatus according to an exemplary embodiment of the present invention.

For heating of the storage tank 110 and the mixing tank 130, two kinds of heaters are installed. In order to enhance heating efficiency, because contact of a heater and a heating unit is important, in a body portion (sodium storage unit or mixing unit) of the storage tank 110 and the mixing tank 130, a band heater 172 in which a surface and the heater can easily contact is installed to enable to good contact with only bolt clamping. Because a lower portion of the storage tank 110 and the mixing tank 130 is formed in a hemispherical shape, a casting heater 174 may be used for easily contacting with a heater to correspond to such a hemispherical shape. The band heater 172 and the casting heater 174 are detachably mounted and may be installed to easily perform maintenance.

<Sodium Reaction Experiment>

The foregoing sodium reaction experiment using the sodium-nanoliquid reactivity experiment apparatus 100 is performed according to the following order.

First, sodium of the storage tank 110 is moved to the mixing tank 130.

Second, after sodium and nanoparticle are mixed in the mixing tank 130, a sodium-nanoparticle mixture (sodium-nanoliquid) is moved to the reactor 150.

Third, water and a sodium-nanoparticle mixture are reacted in the reactor 150.

The above process will now be described in detail.

Figure 4:
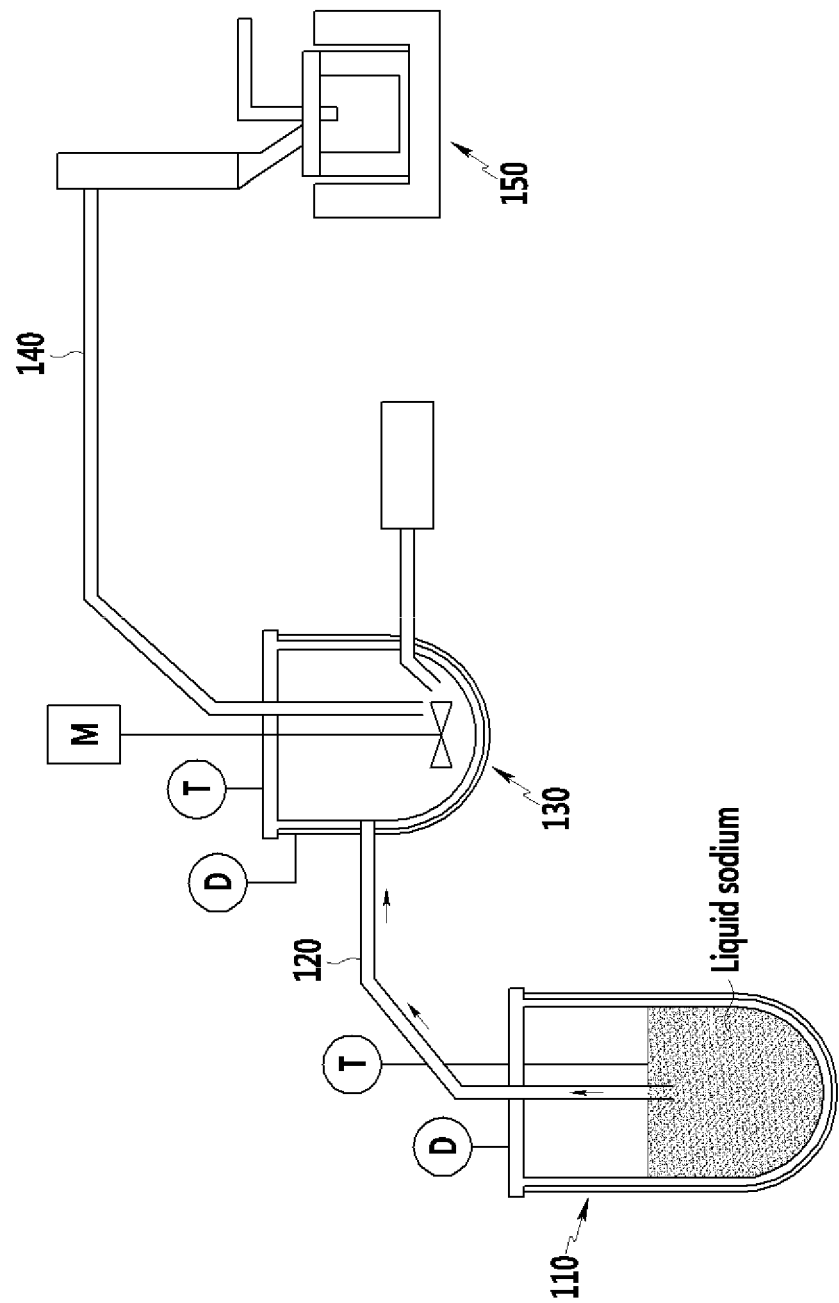
FIG. 4 is a schematic diagram illustrating a process of moving sodium of a storage tank to a mixing tank using a sodium-nanoliquid reactivity experiment apparatus according to an exemplary embodiment of the present invention.

FIG. 4 is a schematic diagram illustrating a process of moving sodium from a storage tank to a mixing tank using a sodium-nanoliquid reactivity experiment apparatus according to an exemplary embodiment of the present invention.

Referring to FIG. 4, in order to move sodium from the storage tank 110 to the mixing tank 130, a method of using a pressure difference is used. A sodium moving tube (⅜" tube, first transport line 120) is inserted into liquid sodium that is melted within the storage tank 110. While gradually increasing pressure within the storage tank 110 using argon gas, due to a pressure difference with the mixing tank 130, liquid sodium within the storage tank 110 flows little by little through the sodium moving tube to be finally moved to the mixing tank 130. When a desired amount of liquid sodium is housed in the mixing tank 130 that is determined through a level gauge that is installed in the mixing tank 130, if a pressure of the storage tank 110 is removed and a high pressure is applied to the mixing tank 130, sodium movement is stopped and the liquid sodium within the sodium moving tube is discharged back to the storage tank 110.

Figure 5:
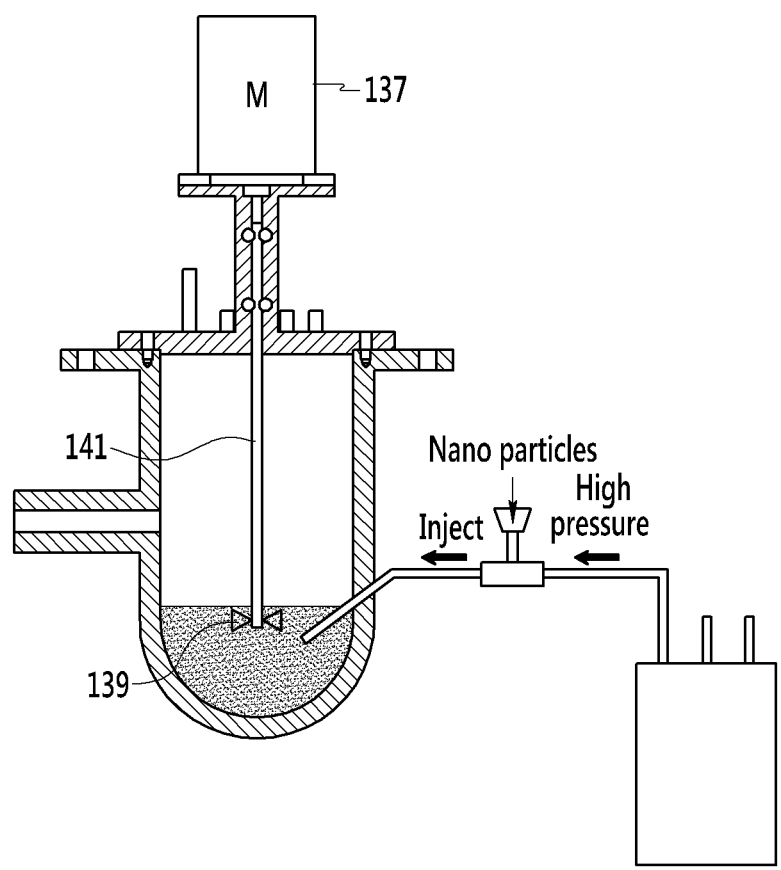
FIG. 5 is a schematic diagram illustrating a process of mixing sodium and nanoparticles in a mixing tank and moving the mixed sodium and nanoparticles to a reactor using a sodium-nanoliquid reactivity experiment apparatus according to an exemplary embodiment of the present invention.

FIG. 5 is a schematic diagram illustrating a process of mixing sodium and nanoparticles in a mixing tank and moving the mixture of sodium and nanoparticles to a reactor using a sodium-nanoliquid reactivity experiment apparatus according to an exemplary embodiment of the present invention.

Referring to FIG. 5, nanoparticles are injected into the liquid sodium that is moved from the storage tank 110. When injecting nanoparticles into a tube that is connected to the mixing tank 130 and applying a high pressure to the rear end, nanoparticles are injected into the liquid sodium within the mixing tank 130 by the pressure. Thereafter, a stirrer 141 is rotated by a motor 137 that is installed at the upper end of the mixing tank 130, and an impeller 139 that is attached at an end portion of the stirrer 141 mixes the nanoparticles and liquid sodium while rotating within the liquid sodium.

Figure 6:
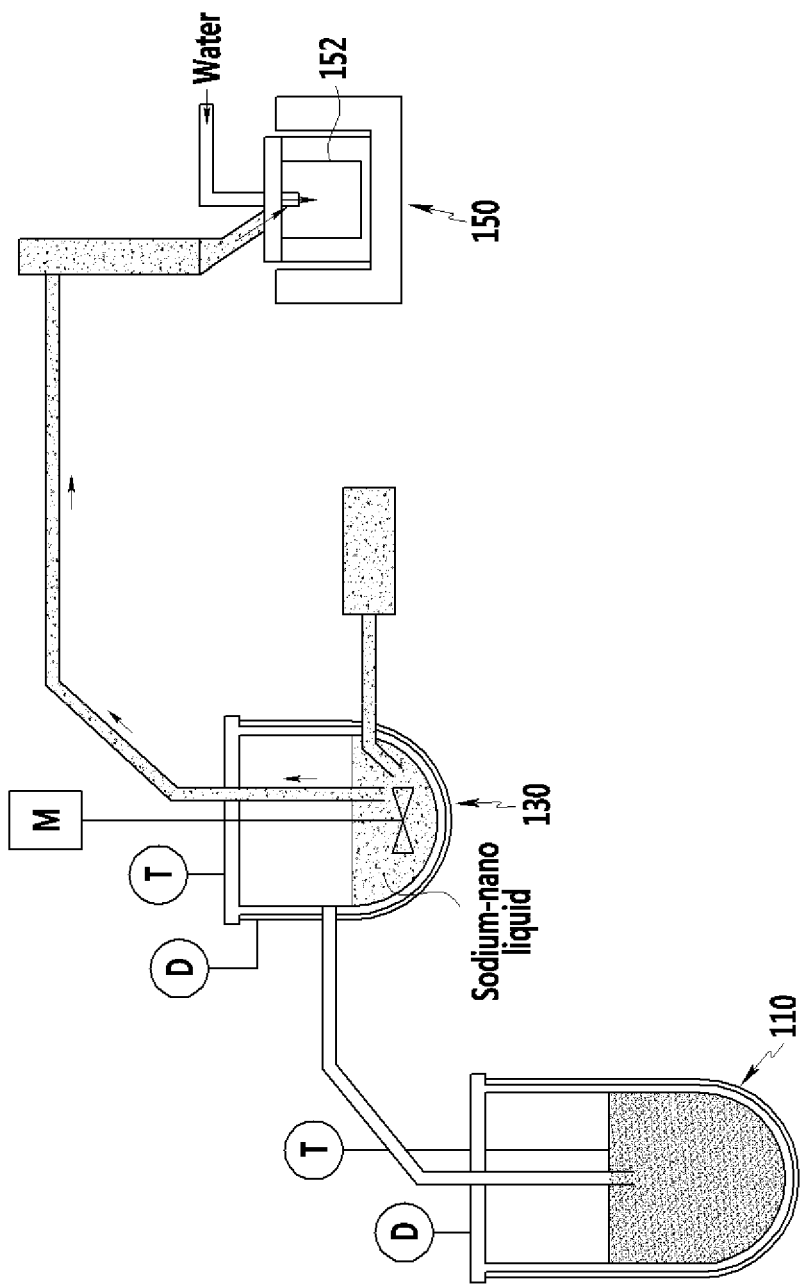
FIG. 6 is a schematic diagram illustrating a process of reacting sodium with water in a reactor using a sodium-nanoliquid reactivity experiment apparatus according to an exemplary embodiment of the present invention.

FIG. 6 is a schematic diagram illustrating a process of reacting sodium with water in a reactor using a sodium-nanoliquid reactivity experiment apparatus according to an exemplary embodiment of the present invention.

Referring to FIG. 6, a sodium-nanoliquid mixture that is produced as above is moved to the reactor 150 due to a pressure difference between the mixing tank 130 and the reactor 150. The sodium-nanoliquid mixture of the mixing tank 130 is injected into the reactor 150 that is heated to about 130° C. The lower end of the reactor 150 is heated by a copper heater such that an internal atmosphere temperature thereof exceeds 100° C., and in order to determine reactivity, the temperature of the periphery where sodium and water react and the pressure are measured. Water passes through a check valve using a syringe and is ejected to the sodium surface, and the sodium reacts with the water.

In this way, by a sodium-nanoliquid reactivity experiment apparatus according to the present exemplary embodiment, a continuous experiment that can determine reactivity with water while dispersing nanoparticles into the sodium in a liquid state can be performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A sodium-nanoliquid reactivity experiment apparatus, comprising:
    a storage tank that stores liquid sodium;
    a mixing tank that is connected to the storage tank through
        a first transport line to receive supply of the liquid sodium and that injects nanoparticles to mix the nanoparticles with the liquid sodium;

a reactor that is connected to the mixing tank through a second transport line to receive supply of a sodium-nanoparticle mixture and that injects water to react the water with the sodium-nanoparticle mixture, wherein the reactor comprises a reacting region in which a reaction of the sodium-nanoparticle mixture and water occurs, a buret connected between the second transport line and the reacting region to adjust an amount of the supplied sodium-nanoparticle mixture, and a water injection pipe injecting water into the reacting region;

a temperature gauge and a pressure gauge that are installed in the reactor to observe explosion reactivity within the reacting region;

a vapor trap that is connected to the upper end of the buret to filter an evaporated sodium vapor; and an argon gas injection line that is installed in the reactor to form an argon atmosphere within the reacting region.

2. The sodium-nanoliquid reactivity experiment apparatus of claim 1, wherein the storage tank comprises a cylindrical sodium storage unit having a lower portion of a hemispherical shape and a storage tank cover that covers the sodium storage unit.

3. The sodium-nanoliquid reactivity experiment apparatus of claim 2, wherein in a portion of the storage tank cover, a window for viewing the inside of the sodium storage unit is formed.

4. The sodium-nanoliquid reactivity experiment apparatus of claim 1, wherein the mixing tank comprises a cylindrical mixing unit having a lower portion of a hemispherical shape, a mixing tank cover that covers the mixing unit, and a nanoparticle injection line that is connected to the mixing unit to inject the nanoparticles.

5. The sodium-nanoliquid reactivity experiment apparatus of claim 4, wherein in an upper portion of the mixing tank cover, a motor is provided, and the sodium-nanoliquid reactivity experiment apparatus further comprises a stirrer that is connected to a driving shaft of the motor to penetrate the mixing tank cover and that is introduced to the inside of the mixing unit, and an impeller that is mounted in an end portion of the stirrer.

6. The sodium-nanoliquid reactivity experiment apparatus of claim 1, further comprising a heater that is installed to enclose each of the storage tank and the mixing tank.

7. The sodium-nanoliquid reactivity experiment apparatus of claim 6, wherein the heater comprises a casting heater that is mounted in a lower portion of a hemispherical shape of the mixing tank or the storage tank.

8. The sodium-nanoliquid reactivity experiment apparatus of claim 6, wherein the heater comprises a band heater that is mounted in a mixing unit of the mixing tank or a sodium storage unit of the storage tank that is formed in a cylindrical shape.

* * * * *